(12) United States Patent
Csicser et al.

(10) Patent No.: US 6,489,698 B2
(45) Date of Patent: Dec. 3, 2002

(54) ELECTRICAL MACHINE

(75) Inventors: Walter Csicser, Schwieberdingen; Peter Skala, Bietigheim-Bissingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/945,194

(22) Filed: Aug. 31, 2001

(65) Prior Publication Data

US 2002/0047342 A1 Apr. 25, 2002

(30) Foreign Application Priority Data

Sep. 1, 2000  (DE) .......................... 100 43 059

(51) Int. Cl.$^7$ .................................. H02K 9/00
(52) U.S. Cl. .......................... 310/58; 310/68 R
(58) Field of Search .................. 310/54, 58, 57, 310/52, 64, 179, 68 R, 68 D; 363/145, 141

(56) References Cited

U.S. PATENT DOCUMENTS 3,469,073 A    9/1969  Zechin
4,484,049 A  * 11/1984  Ahner et al. .............. 219/10.51
6,160,332 A  * 12/2000  Tsuruhara ................... 310/54

FOREIGN PATENT DOCUMENTS

DE         31 28 081 A1    11/1982
DE         196 49 710 C2   4/1999
EP         0 841 735 A1    5/1998

* cited by examiner

*Primary Examiner*—Nestor Ramirez
*Assistant Examiner*—Hahn Nguyen

(57) ABSTRACT

An electrical machine formed as a generator for a motor vehicle, comprising a stator provided with a stator winding; a cooling casing which surrounds said stator and through which a heat transmitting medium can pass; a circuit in which the heat transmitting medium circulates; at least one heat exchanger for heating purposes arranged in said circuit, said stator being provided with a selectively activatable medium for increasing a stator stray power.

8 Claims, 2 Drawing Sheets

ELECTRICAL MACHINE

BACKGROUND OF THE INVENTION

The present invention relates to an electrical machine, in particular a generator for a motor vehicle.

A known electrical machine is disclosed in the European patent document EP 0 841 735 A1 and used as a water-cooled alternating or rotary current generator in motor vehicles. Its cooling casing is integrated in the cooling water circuit of the combustion engine. In the cooling water circuit also a motor cooler and air-water heat exchanger for a heating device, a circulating pump as well as regulating valve for a throughflow control of the cooling water are arranged. The unavoidable stray power of the generator can be efficiently withdrawn through the water-through flowed cooling casing. Moreover, there is the advantage that this stray power, differently from air-cooled generator, is not lost, but instead is taken by the cooling water which flows through the heat exchanger and is used in the heat exchanger for improving its feed power. This is especially advantageous for diesel motors with direct injection of multi-purpose motor vehicles, having high efficiency, since in this motor type the heating of the cooling water is moderate and allows only a little efficient inner space heating.

SUMMARY OF THE INVENTION

Accordingly, it is an object of the present invention to provide an electrical machine of the above mentioned general type, which avoids the disadvantages of the prior art.

In keeping with these objects and with others which will become apparent herein after, one feature of present invention resides, briefly stated in an electrical machine which has a stator provided with a stator winding; a cooling casing which surrounds said stator and through which a heat transmitting medium can pass; means forming a circuit in which the heat transmitting medium circulates; at least one heat exchanger for heating purposes arranged in said circuit, said stator being provided with a selectively activatable medium for increasing a stator stray power.

The inventive electrical machine has the advantage that when a desired inner space temperature is not reached through the heating heat exchanger the stator stray power of the machine can be purposely increased when and then supplied through the heat transmitting means of the heating heat exchanger and there is used to a greater part for the inner space heating.

In accordance with a preferable embodiment of the invention, the stator stray power can be easily manipulated in that, a multi-phase or a multi-strand stator winding has at least two parallel branches per phase or strand, and switching means are provided which in each phase or in each strand selectively switch at least one branch parallel or separate from the other branch.

Thereby, for example for a three-phase stator winding with two parallel branches per phase, by switching off of one branch per phase the stator stray power in idle running of the combustion engine is increased from approximately 600 W to approximately 1100 W, 5% of current losses of the generator taken into consideration in this operational condition. This stray power which increases with increasing rotary speed of the combustion engine and thereby increasing rotary speed of the generator, provides an additional heating power for heating the interior space between 500 W and 750 W which is supplied to the heat transmitting means.

These numbers are applicable for example for a rotary current generator with a stator winding switched in a triangle with an applied nominal current of 150 A.

The desired additional heating power can be realized with relatively low additional expenses, when in accordance with a preferable embodiment of the present invention for the use in a motor vehicle, the stator winding is connected to a full-wave rectifier bridge. The first ends of the switchable branches connected to the rectifier bridge are separated from the non-switchable branches in the phases or strands and are connected through each rectifier formed for example as a diode to a common tap point, and the switching means include a controllable switch which on the one hand is connected to the tap point and on the other hand is connected to one of the both bridge outlet terminals of the rectifier bridge. The additional expenses amount then to three diodes, a power-MOSFET as a switch, and a simple control electronic circuit for the MOSFET.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
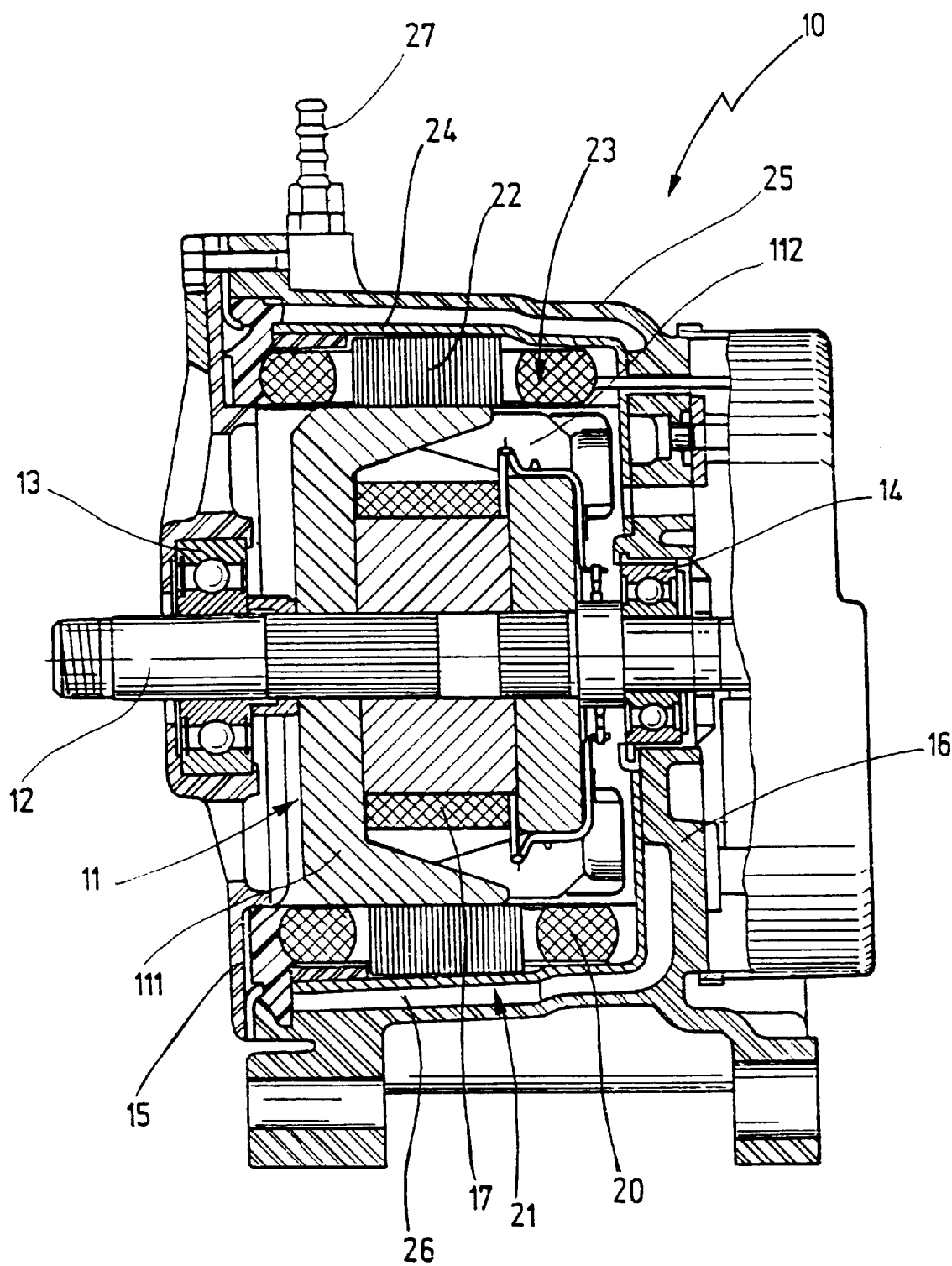
FIG. 1 is a longitudinal section of a generator for a motor vehicle.

As an example of a general electrical machine, a water-cooled generator 10 for a motor vehicle is shown in a longitudinal section in FIG. 1. It has in a known manner a so-called claw pole rotor 11 which is arranged non-rotatably on a rotor shaft 12. The rotor shaft 12 is rotatably supported by roller bearings 13, 14 in coaxial bearing shields 15, 16. The rotor is composed of two claw shells 111, 112 which engage one another with their claw poles formed as teeth. An excitation winding 17 is received between the claw shells 111, 112. A field excitation voltage is applied to the excitation winding 17 by two not shown grinding rings which are arranged on the rotor shaft 12.

A stator 21 surrounds in a known manner the rotor 11 with a gap therebetween. It has a stator plate pack 22 or a so-called iron plate pack, as well as a stator winding 23. The stator winding is inserted in axial grooves provided in a known manner in the stator plate pack 22. The winding head 20 of the stator winding 23 which extend from the stator plate pack 22 at both end sides are shown in a section of FIG. 1. The stator plate pack 22 is pressed into a cup-shaped stator housing 24 which is surrounded by a cooling casing 25. The cooling casing 25 is also cup-shaped, and its cup bottom forms a bearing shield 15. The other bearing shield 16 is placed on the cup edge and closes the cooling jacket 25 at the end side. A fluid-tight closed ring chamber 26 is provided between the cooling casing 25 and the stator housing 24. It communicates with a supply pipe 27 and a not shown discharge pipe.

Figure 3:
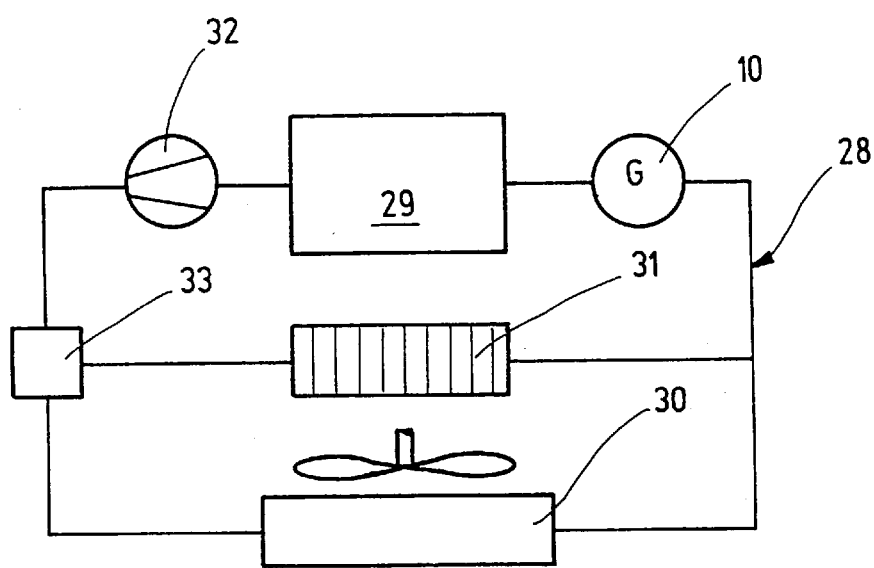
FIG. 3 is a block switching diagram of a cooling water circuit of the motor vehicle with the generator of FIGS. 1 and 2.

The ring chamber 26 in the cooling casing 25 is incorporated in the cooling water circuit 28 of the internal combustion of the vehicle through both connections, mainly the supply pipe 27 and the discharge pipe. The cooling water circuit 28, as schematically shown in FIG. 3 in addition to the combustion engine 29 and the generator 10, also incorporates a motor cooler 30, an air-throughflow heating heat exchanger 31 for a heating or a climate device of the vehicle, a circulating pump 32, as well as a thermostat valve 33. The thermostat valve is formed so that under a predetermined operational temperature of the combustion engine, the cooling water which is heated by the combustion engine flows only through the heating heat exchanger 31, and when the operational temperature is exceeded the motor cooler 30 is introduced into the circulation of the cooling water.

In order to improve the efficiency of the combustion engine 29 which is formed as direct injection diesel motor for multi-purpose motor vehicle and provides a little efficient inner space heating, the generator 10 which is connected with its cooling medium 25 to the cooling water circuit 28 is formed so that, via internal, selectively activatable medium its efficiency can be worsened and thereby the high stray power produced in the generator is withdrawn directly to the cooling water, so that the heating heat exchanger 31 makes available a greater heating potential of the cooling water. These means are realized by a circuit change in the stator 21.

Figure 2:
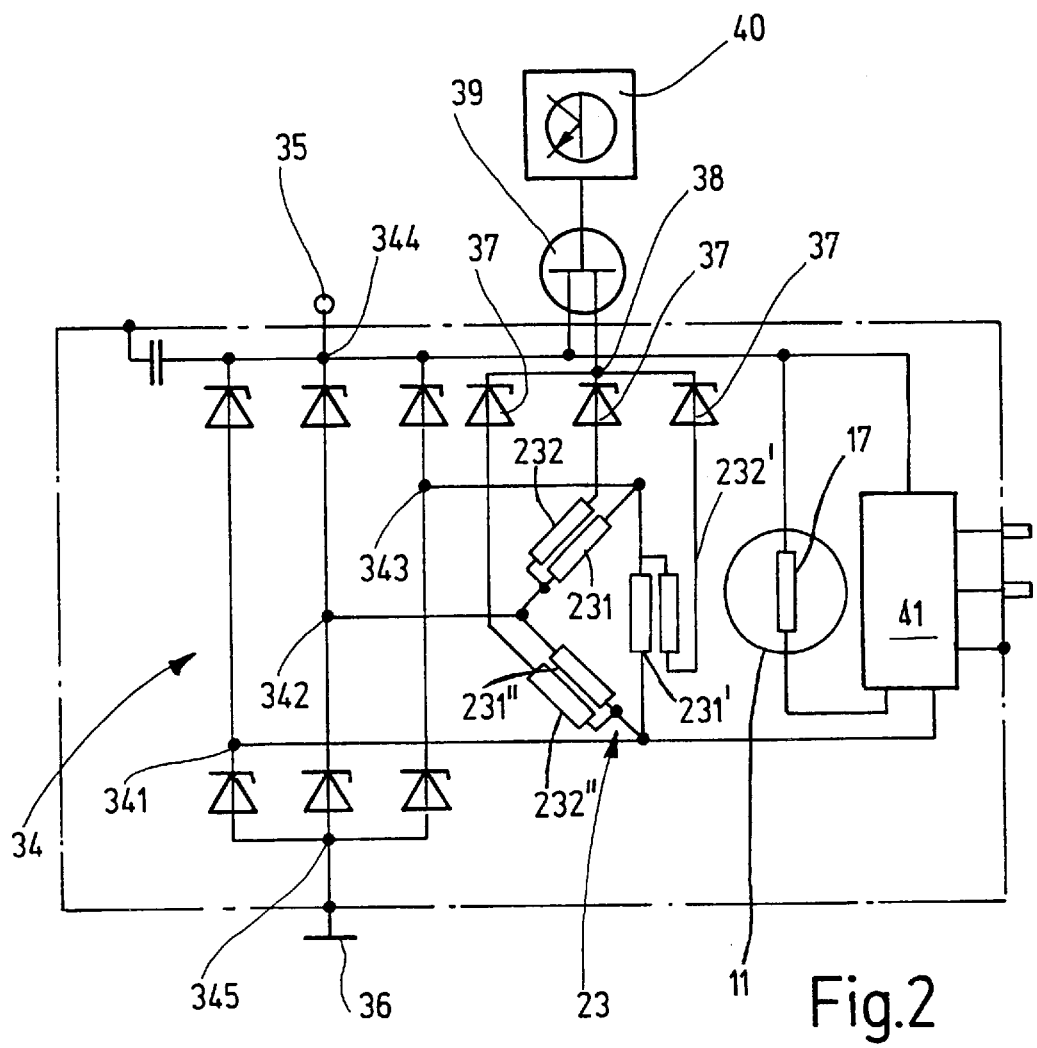
FIG. 2 is a switching diagram of a generator which is coupled with a board electrical system of the vehicle of FIG. 1.

FIG. 2 shows a block diagram of the generator 10 which is connected through a rectifier bridge 34 to the 12 V board electrical system. The stator winding 23 is formed as a three-phase winding and connected in a triangle. The stator winding 23 is associated with the rotor 11 of the excitation winding 17. A controller 41 controls the field excitation. The three-phase stator winding 23 is provided with two parallel branches 231, 231', 231" and 232, 232', 232". The triangle points are connected at the central taps 341, 342, 343 with the three-phase full-wave rectifier bridge 34. The both output terminals 344, 345 of the rectifier bridge 34 are connected to a positive pole 35 and a negative pole 36 of the vehicle battery. In order to purposely provide worsening of the efficiency for increasing the stray power of the stator 21, in each phase or each strand of the stator winding 23 the strand ends of the branches 232, 232', 232" which are connected with the central tap of the rectifier bridge 34 are separated from the strand ends of the branches 231, 231' and 231" and are placed each through a diode 37, which is formed here is a Zener diode, on a common tap point 38. A field effect transistor 39, for example a power MOSFET is connected on the one hand to the tap point 38 and on the other hand to the output terminal 344 of the rectifier bridge 34 connected to the positive pole 35. The field effect transistor 39 is controlled by a simple control electronic unit 40. When the field effect transistor 39 is controlled, the branches 232, 232',232" are connected in parallel to the branches 231, 231',231". The stator winding 23 is then a conventional three-phase winding with two parallel connected branches per each strand or phase. When the field effect transistor 39 is blocked, the parallel branches 232, 232', 232" are switched off. Thereby the stator stray power is increased to a relatively high degree. This increased stray power of the generator 10 is given away to the cooling water in the cooling water circuit 28 and makes available in the heating heat exchanger 31 a very high portion for the inner space heating of the vehicle.

The present invention is not limited to the above described embodiment. For example three phrase stator winding 23 in FIG. 2 can be also connected in a star. In this case the star point for the parallel branches 232, 232',232" is released and the stand ends of this parallel branches 232, 232',232" are applied in the same way on the tap point 38 through a diode 37.

It is also not necessary to connect the field effect transistor 39 of the tap point 38 with the output terminal 344 located at the positive pole 35 of the vehicle battery. Alternatively, the tap point 38 can be applied through the field effect transistor 39 also to the output terminal 345 connected to the negative pole 36. In this case the polarity of the diodes 37 is to be inverted.

The invention is also not limited to a three-phrase or a three-strand stator winding 23. Any phase number can be selected for the stator winding 23.

It will be understood that each of the elements described above, or two or more together, may also find a useful application in other types of constructions differing from the types described above.

While the invention has been illustrated and described as embodied in electrical machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. An electrical machine formed as a generator for a motor vehicle, comprising a stator provided with a stator winding; a cooling casing which surrounds said stator and through which a heat transmitting medium can pass; means forming a circuit in which the heat transmitting medium circulates; at least one heat exchanger for heating purposes arranged in said circuit, said stator being provided with a selectively activatable medium for increasing a stator stray power, said means for increasing the stator stray power including said stator winding which is formed as a multi-phase winding having at least two parallel branches per each phase, and a switching means, which in each phase selectively switch at least one branch parallel to the other branch or separate said at least one branch from the other branch.

2. An electrical machine as defined in claim 1, and further comprising a full-wave rectifier bridge; and a rectifier, said switching means including a switch arranged so that said multi-phase stator winding is connected to said full-wave rectifier bridge, strand ends of the switchable branch connected with the rectifier bridge being separated from the non-connected branches in the phases and applied each through said rectifier to a common tap point, and said switch being connected to said tap point and to both bridge outlet clamps.

3. An electrical machine as defined in claim 2, wherein said switch is an electronic switch.

4. An electrical machine as defined in claim 3, wherein said electronic switch is a field effect transistor.

5. An electrical machine as defined in claim 4, wherein said field effect transistor is a power MOSFET.

6. An electrical machine as defined in claim 2, wherein said stator winding is a three-phase winding and connected in a triangle.

7. An electrical machine as defined in claim 2, wherein said stator winding is a three-phase winding and connected in a star.

8. An electrical machine formed as a generator for a motor vehicle, comprising a stator provided with a stator winding; a cooling casing which surrounds said stator and through which a heat transmitting medium can pass; means forming a circuit in which the heat transmitting medium circulates; at least one heat exchanger for heating purposes arranged in said circuit, said stator being provided with a selectively activatable medium for increasing a stator stray power, said means for increasing the stator stray power including said stator winding which is formed as a multi-phase winding having at least two parallel branches per each phase, and a switching means, which in each phase selectively switch at least one branch parallel to the other branch or separate said at least one branch from the other branch, and a circulation of a heat transfer medium in said cooling water circuit is provided in a combustion engine of a motor vehicle and said heat exchanger is a part of a heating or a climate device of the vehicle.

* * * * *